(12) United States Patent
Urushiya

(10) Patent No.: US 7,486,765 B2
(45) Date of Patent: Feb. 3, 2009

(54) IMAGE PROCESSING DEVICE AND IMAGE PROCESSING METHOD

(75) Inventor: Hiroyuki Urushiya, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/851,084

(22) Filed: Sep. 6, 2007

(65) Prior Publication Data

US 2008/0008374 A1    Jan. 10, 2008

Related U.S. Application Data

(62) Division of application No. 11/202,092, filed on Aug. 12, 2005, now Pat. No. 7,317,781.

(30) Foreign Application Priority Data

Aug. 19, 2004 (JP) ............................. 2004-239690

(51) Int. Cl.
*A61B 6/03* (2006.01)
(52) U.S. Cl. .......................... 378/19; 378/901
(58) Field of Classification Search ...................... 378/4, 378/15, 19, 901
See application file for complete search history.

(56) References Cited

U.S. PATENT DOCUMENTS

| | | | |
|---|---|---|---|
| 5,909,477 A * | 6/1999 | Crawford et al. ................ | 378/4 |
| 6,188,745 B1 | 2/2001 | Gordon ......................... | 378/19 |
| 6,263,008 B1 * | 7/2001 | Lai .............................. | 378/19 |
| 6,373,916 B1 * | 4/2002 | Inoue et al. ..................... | 378/4 |
| 7,061,533 B1 | 6/2006 | Urushiya | |
| 7,317,781 B2 * | 1/2008 | Urushiya ...................... | 378/19 |
| 2004/0202283 A1 | 10/2004 | Okumura et al. ............ | 378/145 |
| 2005/0175143 A1 | 8/2005 | Miyazaki et al. ............. | 378/19 |
| 2005/0276371 A1 | 12/2005 | Urushiya | |
| 2005/0276375 A1 | 12/2005 | Urushiya | |
| 2006/0049358 A1 | 3/2006 | Oumi et al. | |
| 2006/0140337 A1 | 6/2006 | Miyazaki et al. ............... | 378/8 |

FOREIGN PATENT DOCUMENTS

EP    1 079 330 A2    2/2001

OTHER PUBLICATIONS

European Search Report for Application No. EP 05 25 5111, date of completion of the search: Feb. 7, 2006.
Tohru Sasaki et al., "Reconstruction of 3-D X-Ray Computerized Tomography Images Using a Distributed Memory Multiprocessor System," Information Processing Society of Japan, pp. 1681-1690, vol. 38, No. 9, Sep. 1997.

* cited by examiner

*Primary Examiner*—Chih-Cheng G Kao
(74) *Attorney, Agent, or Firm*—Fitzpatrick, Cella, Harper & Scinto

(57) ABSTRACT

To provide an image processing device and method capable of achieving a high-speed reconstruction process to a cone-beam CT image, an area necessary for reconstruction in a projection image is determined from a slice position to be reconstructed, and a convolution process is executed by using the determined area. Moreover, the slice position to be reconstructed is divided into plural blocks, the areas of the projection image corresponding thereto are cut out, and the processing unit is set for each block as local data of each block, and the set unit is allocated with respect to each operation, whereby parallel processes are executed.

7 Claims, 14 Drawing Sheets

IMAGE PROCESSING DEVICE AND IMAGE PROCESSING METHOD

CROSS-REFERENCE TO RELATED APPLICATIONS

This application is a divisional of U.S. patent application Ser. No. 11/202,092, filed Aug. 12, 2005 and claims benefit of the filing date of that application, and priority benefit of the filing date of Japanese patent application no. 2004-239690 filed Aug. 19, 2004. The entire disclosures of these prior applications are incorporated herein by reference.

BACKGROUND OF THE INVENTION

1. Field of the Invention

The present invention relates to an image processing device and an image processing method which are suitable for a process of a cone-beam CT (computerized tomography) image.

2. Related Background Art

FIG. 2 shows the outline of a cone-beam X-ray CT device (or scanner).

In FIG. 2, X-rays irradiated from an X-ray tube 103 are absorbed and attenuated inside the body of a subject 102, and the X-rays that have passed through the subject 102 are detected on a surface sensor 101. Then, the X-ray tube 103 and the surface sensor 101 are rotated around the subject 102 without changing the relative physical relationship between the X-ray tube 103 and the surface sensor 101, whereby the projection image data of the subject 102 for a full one rotation is acquired. Thus, the projection image data acquired like this is subjected to a reconstruction process, whereby the tomographic image of the subject 102 is acquired. Incidentally, to acquire the same tomographic image, the subject 102 may be rotated instead of rotating the X-ray tube 103 and the surface sensor 101.

In the reconstruction process, a convolution process is first executed on the projection image data as shown in FIG. 3, and the convolution-processed projection image data is then subjected to back projection to each pixel of the reconstruction image as shown in FIG. 4.

To execute the reconstruction process at high speed, for example, a multiprocessor is used. Here, it should be noted that the method of achieving the high-speed reconstruction process by using the multiprocessor is described in "Reconstruction of 3-D X-ray Computerized Tomography Images Using a Distributed Memory Multiprocessor System", Tohru Sasaki and Yasushi Fukuda, *Information Processing Society of Japan Transaction*, Vol. 38, No. 9 (hereinafter called "document 1"). In this method, the parallel processes are achieved by using plural processors, and also the data is transferred at high speed. That is, the high-speed reconstruction process is achieved mainly by means of hardware.

However, the following important problems occur in the cone-beam CT. In the conventional technique, the projection image data acquired all over the projection angles is line data corresponding to the one-dimensional fan beam. However, in the cone-beam CT, the projection image data is two-dimensional image data, and as a result the amount of data necessary in the process is huge. For this reason, if the convolution process is executed on that huge amount of data as in the method described in document 1, it is inefficient, and thus, it is impossible to achieve the high-speed reconstruction process by the hardware. Moreover, even if the parallel processes are executed, a huge amount of projection image data must be stored in the local memory of each of the processing units, whereby the capacity of each local memory must be made very large, at a high cost.

SUMMARY OF THE INVENTION

In consideration of the above conventional problems, an object of the present invention is to provide an image processing device and an image processing method which can achieve a high-speed reconstruction process of a cone-beam CT image.

Here, an image processing device according to the present invention is an image processing device that comprises an image input unit adapted to obtain a cone-beam CT image from a detector detecting X-rays that have passed through a subject. A designation unit designates plural slice positions of the subject, and an extraction unit extracts an area necessary for reconstruction of surfaces of the plural slice positions, based on space between the plural slice positions. A convolution processing unit performs a convolution processing on the extracted area extracted by the extraction unit, and an image processing unit executes a back projection processing for the reconstruction on the area on which the convolution processing has been performed. The extraction unit extracts, as the area necessary for reconstruction, the area from $Z_i \times (D+S)/(D+R)$ to $Z_i \times (D+S)/(D-R)$ of the height based on the location of the X-ray source and the sensor (where the difference in height between the center of the area that is the target of the reconstruction and the X-ray source is $Z_i$, the horizontal distance between the center of the target area and the X-ray source is D, the horizontal distance between the center of the target area and a sensor is S, and the radius of the target area is R).

In another aspect, an image processing device according to the present invention is an image processing device that comprises an image input unit adapted to obtain a cone-beam CT image from a detector detecting X-rays that have passed through a subject. A designation unit designates plural slice positions of the subject, and an extraction unit extracts an area necessary for reconstruction of surfaces of the plural slice positions, based on space between the plural slice positions. A convolution processing unit performs a convolution processing on the extracted area extracted by the extraction unit, and an image processing unit executes a back projection processing for the reconstruction on the area on which the convolution processing has been performed. The extraction unit extracts, as the area necessary for reconstruction, the area from $Z_i \times (D+S)/(D+R)$ to $Z_i \times (D+S)/(D-R)$ of the height based on the location of the X-ray source and the sensor (where the difference in height between the center of the area that is the target of the reconstruction and the X-ray source is $Z_i$, the horizontal distance between the center of the target area and the X-ray source is D, the horizontal distance between the center of the target area and a sensor is S, and the radius of the target area is R), where the reconstruction processing unit executes the reconstruction process independently with respect to each of the plural areas.

DETAILED DESCRIPTION OF THE PREFERRED EMBODIMENTS

Hereinafter, the preferred embodiments of the present invention will be concretely explained with reference to the attached drawings.

Figure 1:
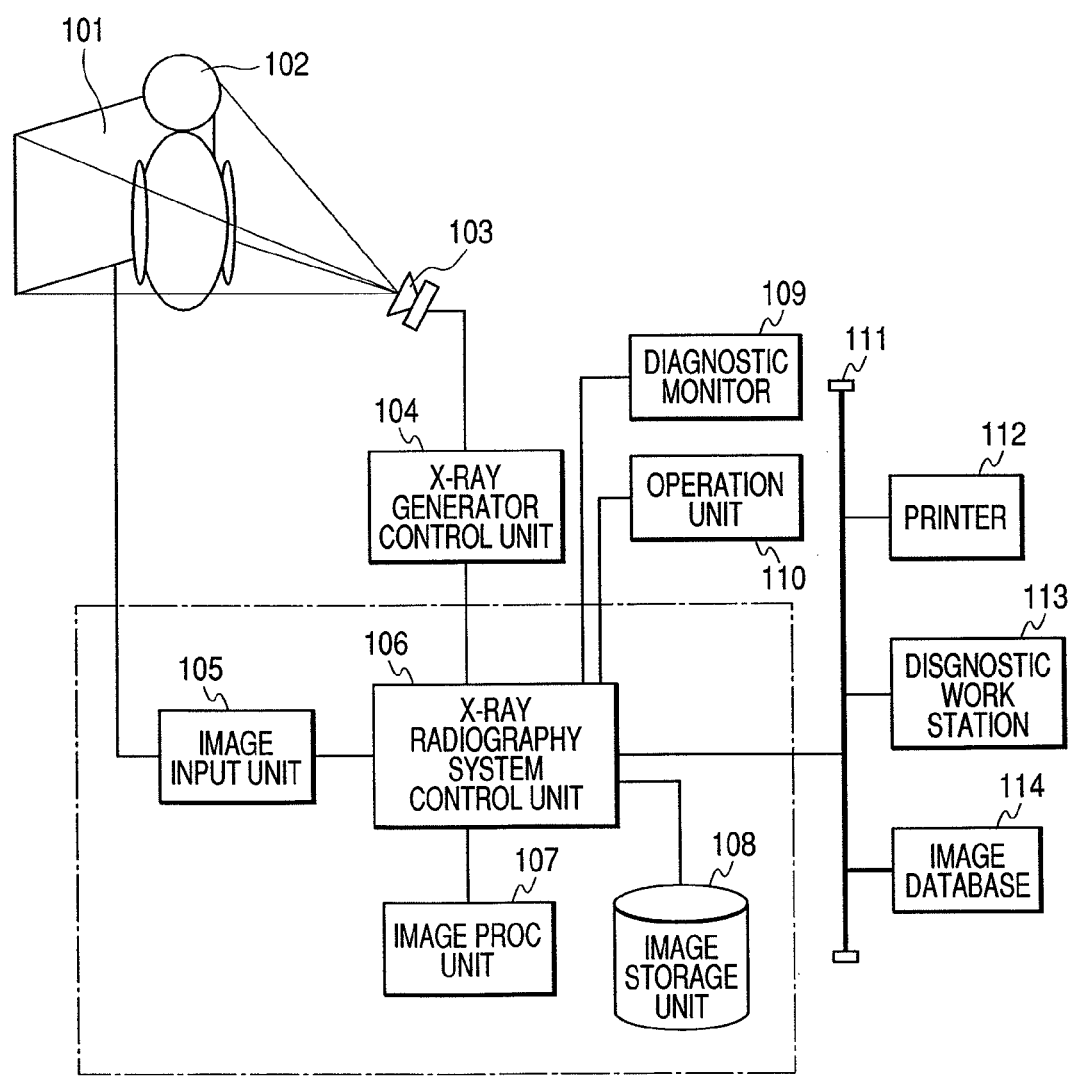
FIG. 1 is a view showing a structural example of a system for implementing the present invention.
Figure 2:
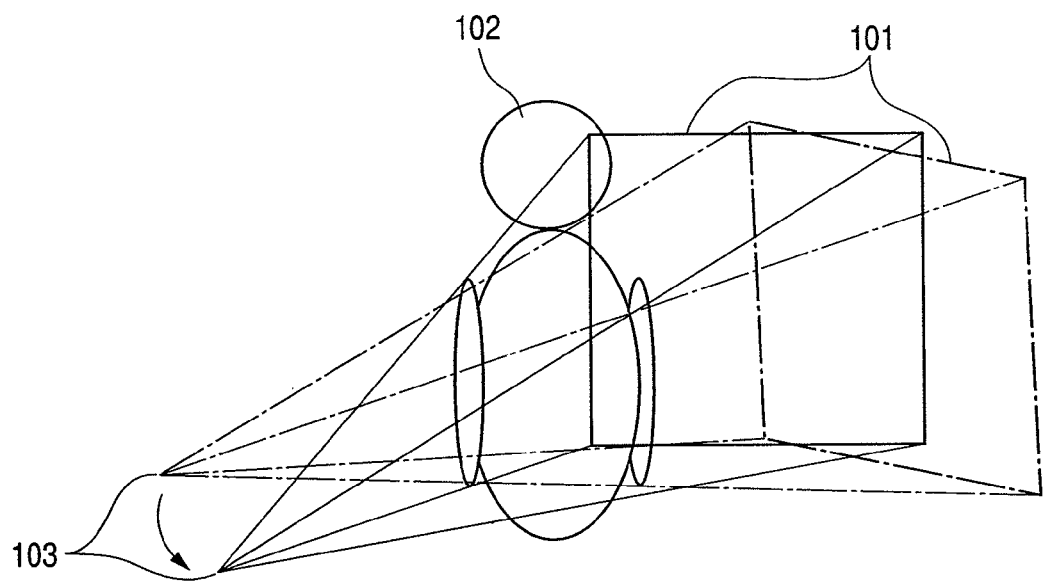
FIG. 2 is a conceptual view for explaining a cone-beam CT (Computed Tomography) process.
Figure 3:
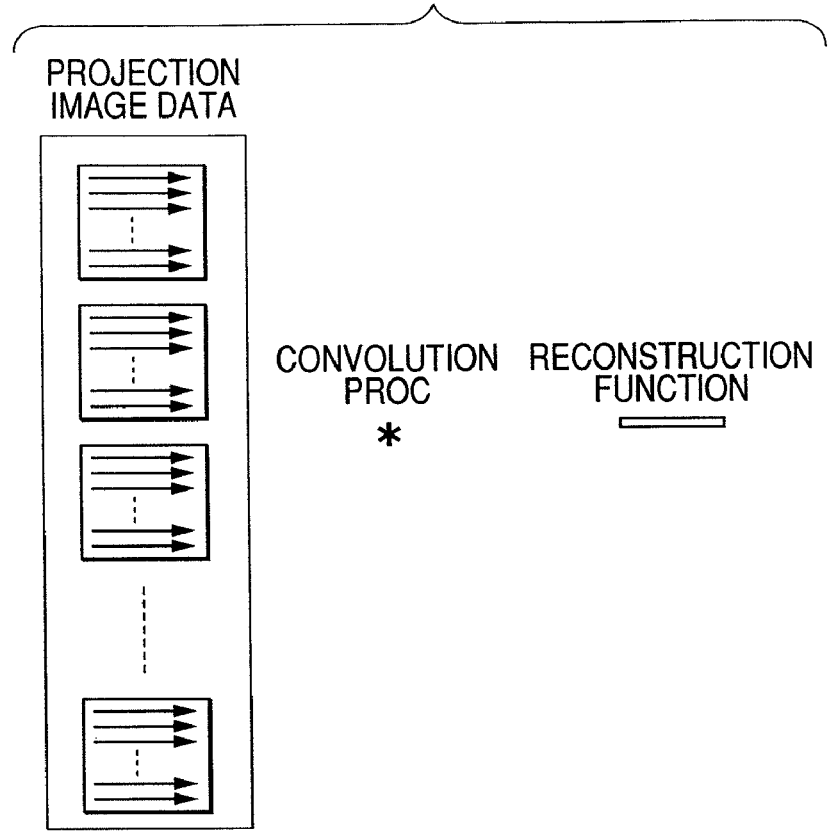
FIG. 3 is a conceptual view for explaining a convolution process.

FIG. 1 is a schematic view for schematically showing entire structure of a cone-beam X-ray CT device having an image processing device according to the most preferred embodiment of the present invention.

An X-ray radiography system control unit 106 executes radiography control of an entire device, image collection, an image process and an image output. When the X-ray radiography system control unit 106 instructs an X-ray generator control unit 104 to generate X-rays, an X-ray source 103 controlled by the X-ray generator control unit 104 generates the X-rays. The X-rays generated by the X-ray source 103 are transmitted through a patient 102 who is the radiographic object, and the transmitted X-rays are detected by an X-ray detector (area sensor) 101. The detected X-rays are input to an image input unit 105 as projection image data. Then, projection images are collected at predetermined evenly spaced rotation angles while rotating the X-ray source 103 and the X-ray detector 101 around the patient, treating the patient 102 being the radiographic object as a center of rotation. It should be noted that the patient 102 may instead be rotated while maintaining the location relationship between the X-ray source 103 and the X-ray detector 101 in a manner that the patient is kept in a state capable of rotating by providing a rotation table (not shown) or the like where the patient 102 is located.

For the projection images which were input for every rotation angle, a preprocess including the correction of the X-ray detector 101 and a log conversion process or an image process such as a reconstruction process or the like is executed by an image processing unit 107, and then a tomographic images group is formed. This image processing unit 107 corresponds to the image processing device according to the present embodiment of the present invention. The formed tomographic images group is displayed on a diagnostic monitor 109, stored in an image storage unit 108 or output to a printer 112, a diagnostic work station 113 and/or an image database 114 through a network 111. Various operations such as a window operation of display, a changeover display operation of a tomographic image in the direction of a body axis, an axial plane (slice plane) converting operation, a three-dimensional surface display operation and the like are executed by an operation unit 110.

Next, an operation of the cone-beam X-ray CT device structured as above described will be explained.

Figure 16:
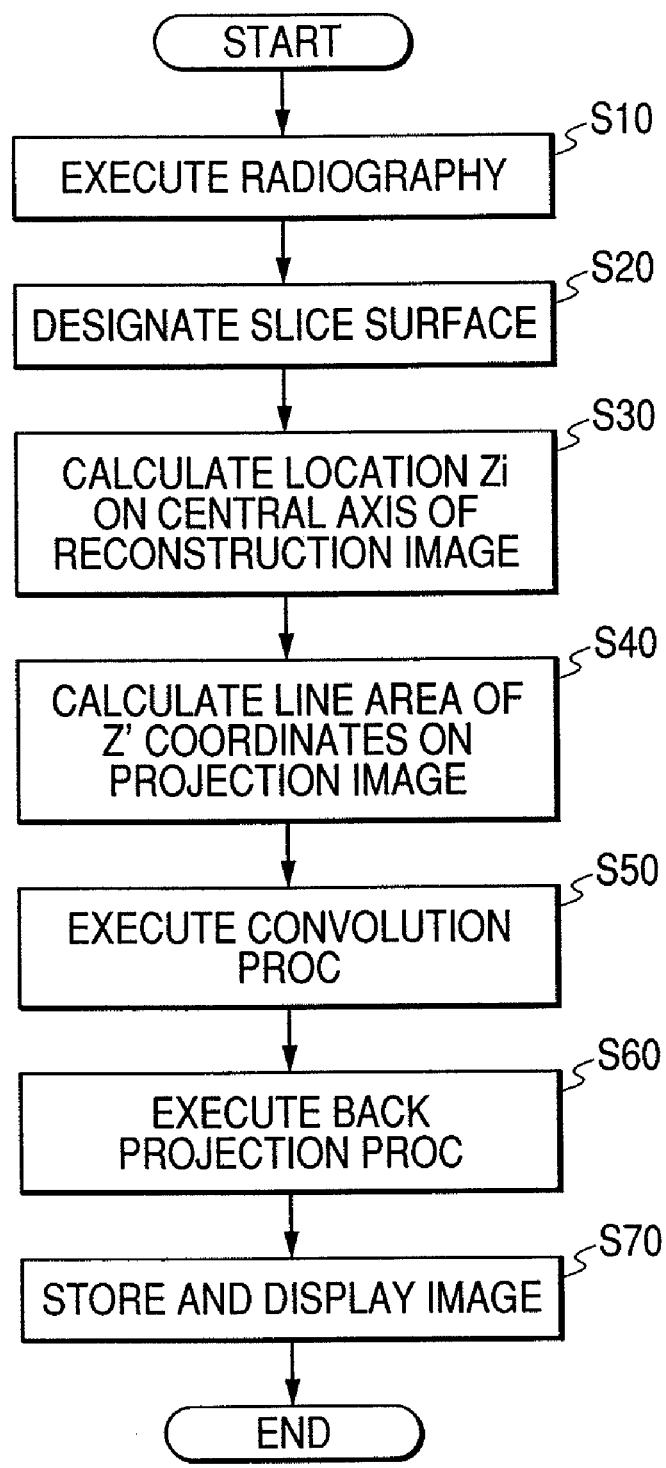
FIG. 16 is a flowchart for explaining an operation to be executed in a cone-beam X-ray CT device according to the present embodiment.

FIG. 16 is a flowchart for explaining an operation to be executed in the cone-beam X-ray CT device.

Initially, a simple radiography for designating a slice position and the CT radiography for obtaining the projection image data are executed (step S10). In the cone-beam X-ray CT device of the present embodiment, since an area sensor is used as the X-ray detector 101, if simple radiography is executed by holding the device and an examinee still, an image for designating the slice position can be obtained. Generally, although a high speed process is required in CT radiography, such high speed process is not required for a still image. Therefore, if the radiography is executed by setting a read-out mode to a high precision read-out, a more preferable high precision still image can be obtained. It is allowed that a projection image radiographed from a specific projection angle is used as a simple radiography image in a case of executing CT radiography for obtaining projection data without executing simple radiography.

Figure 5:
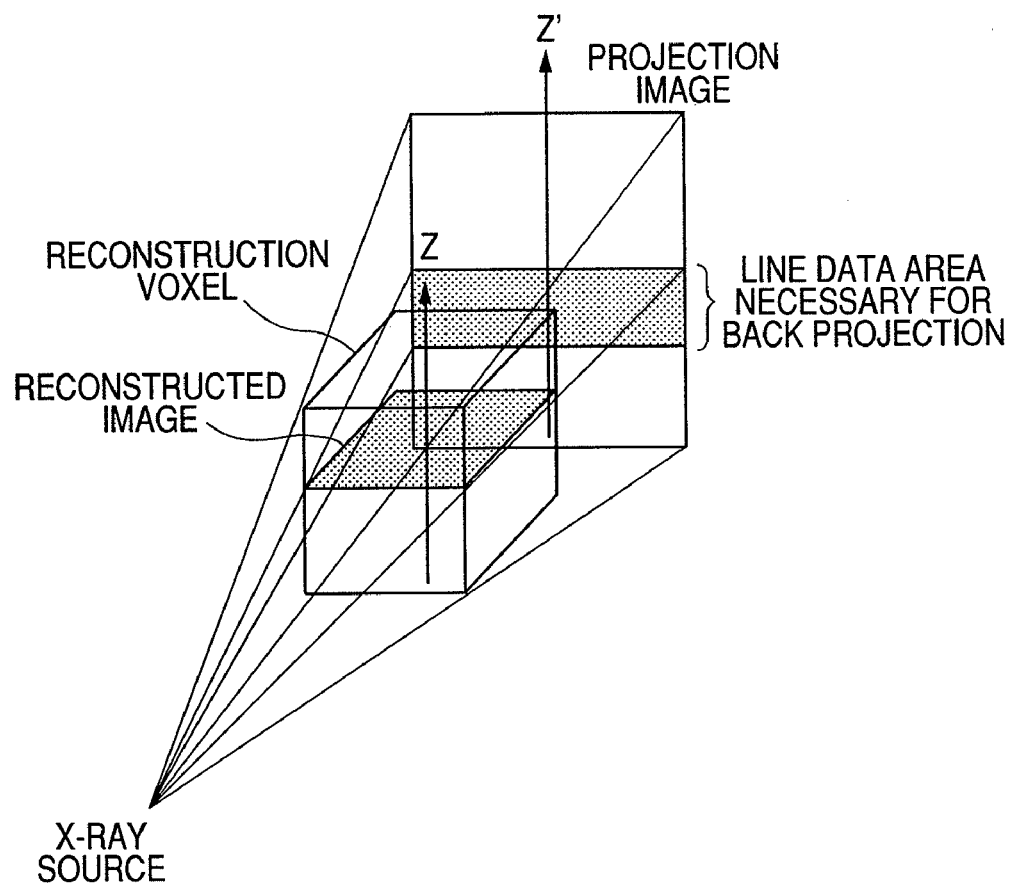
FIG. 5 is a view for explaining a line area of a projection image necessary for a back projection.
Figure 8:
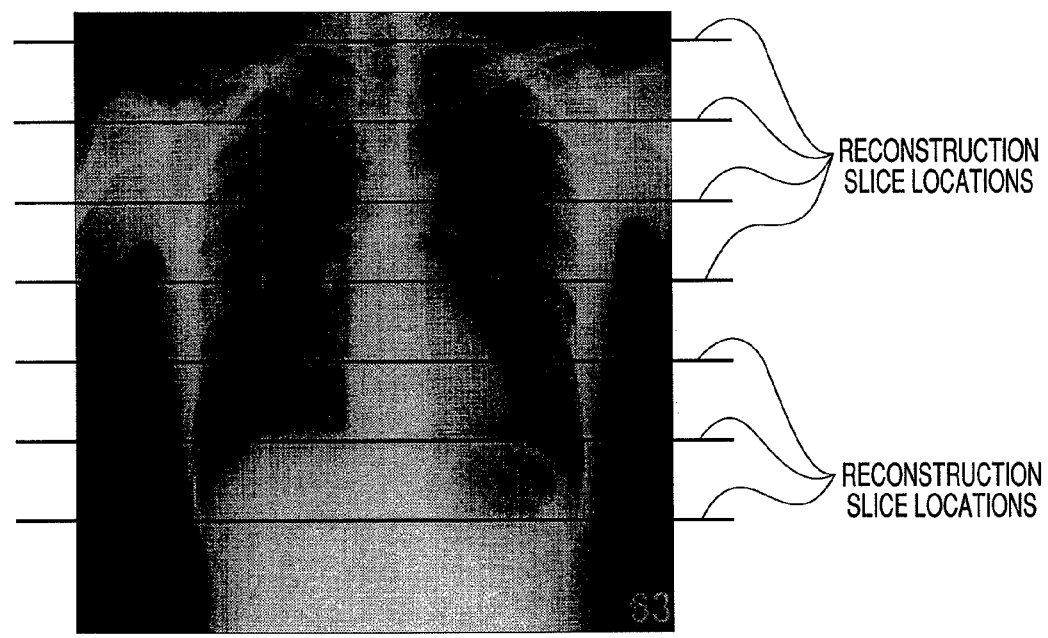
FIG. 8 is a conceptual view for explaining designation of a reconstruction slice position.

Thereafter, a slice surface of a tomographic image to be reconstructed is designated as shown in FIG. 8 by using the obtained simple radiography image (step S20). Projection data necessary for reconstructing a tomographic image on a certain arbitrary slice position is limited within a certain narrow area in a projection image as shown in FIG. 5. The above location relationship is indicated by the location relationship shown in FIG. 6.

Figure 6:
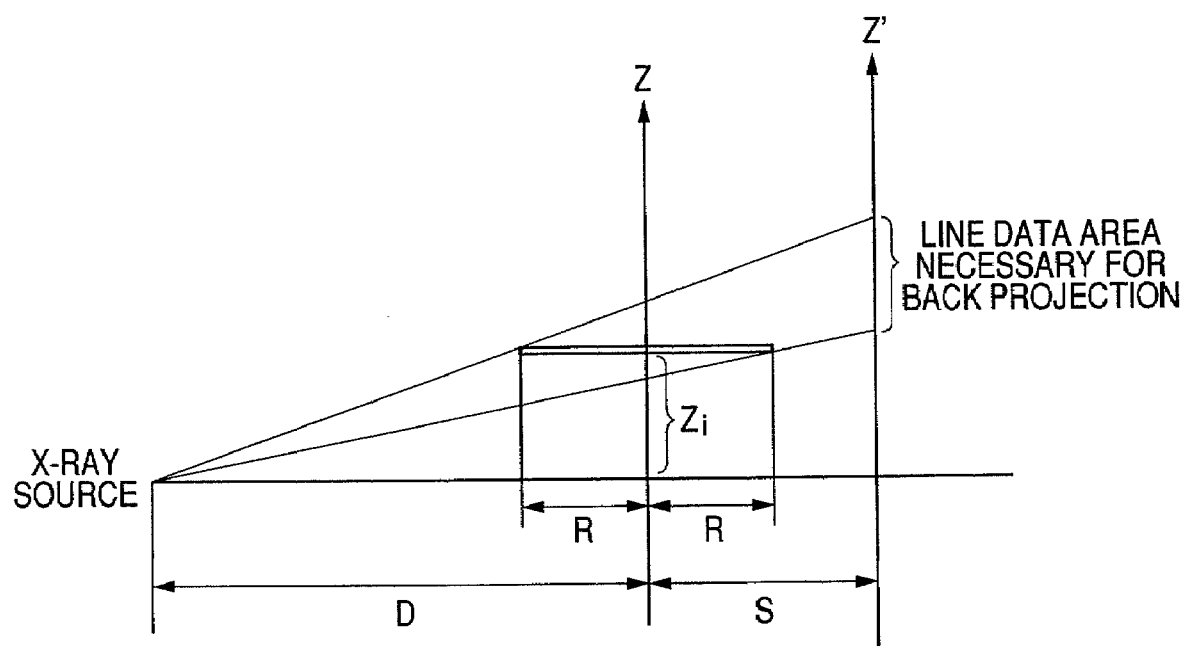
FIG. 6 is a conceptual view for explaining geometrical arrangement of the line area necessary for the back projection.

In FIG. 6, a line area of the Z'-coordinate on the projection image of the slice position, where the Z-coordinate of a reconstruction image is $Z_i$, is represented by the following area:

$$Zi \times \frac{D+S}{D+R} \sim Zi \times \frac{D+S}{D-R} \quad (1)$$

In expression 1, reference symbol R denotes a radius of a reconstruction area (half of the vertical length and the lateral length of the reconstruction image), reference symbol D denotes distance between the X-ray source and a center of rotation (center of the reconstruction image), and reference numeral S denotes distance between the center of rotation and the sensor.

Figure 7:
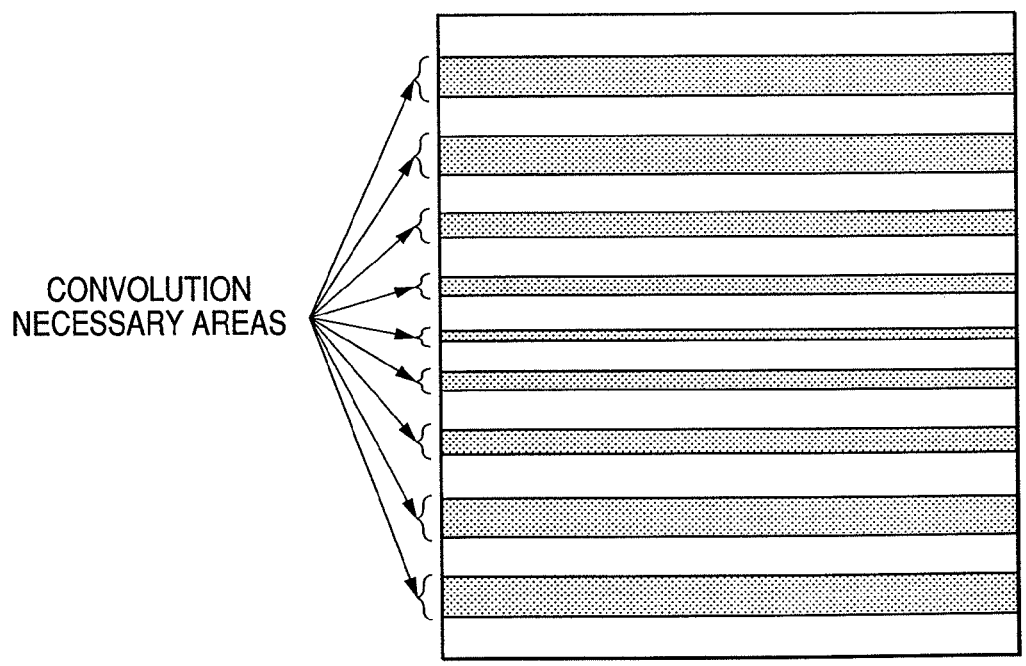
FIG. 7 is a conceptual view for explaining an area necessary for the back projection.

Therefore, for example, in a case where a space between slice positions to be reconstructed is not required to be a dense state, the data of an entire projection image is not always necessary for the reconstruction, and it is allowed that only intermittent areas exist, as shown in FIG. 7. And, it is allowed that a convolution process is also executed only for those intermittent areas.

Figure 9:
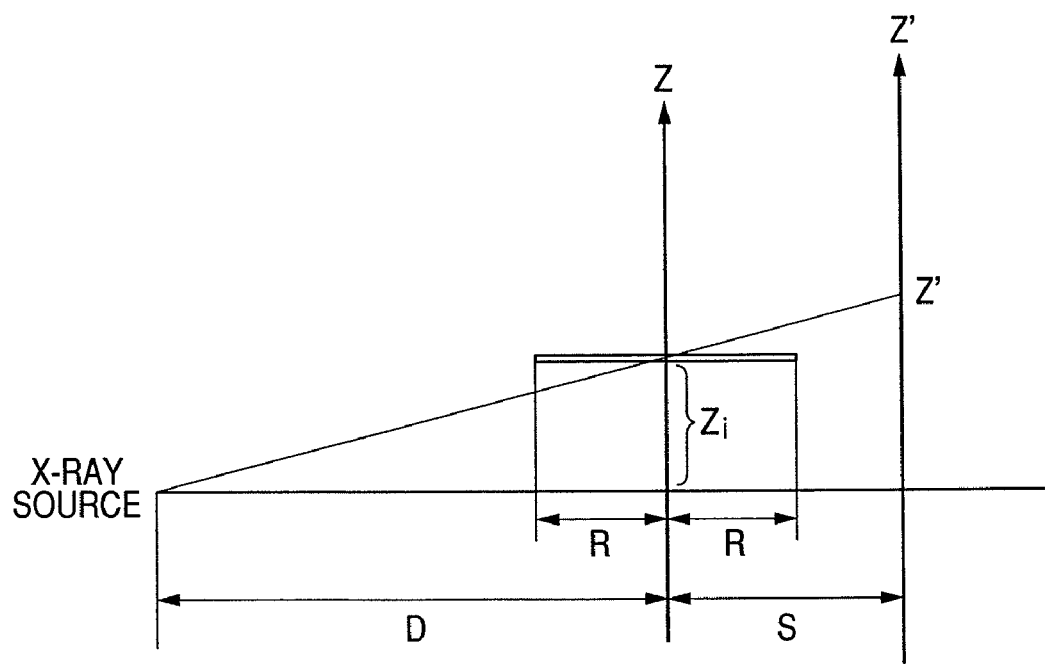
FIG. 9 is a view for explaining a location of the designated reconstruction slice position on a reconstruction image.

If a location of the slice surface designated in the step S20 is assumed as a location on a central axis of the reconstruction image as shown in FIG. 9, the location $Z_i$ on the central axis of the reconstruction image can be calculated from the location Z' of the slice position by the following expression 2 (step S30):

$$Zi = Z' \times \frac{D}{D+S} \quad (2)$$

In expression 2, reference symbol R denotes the radius of the reconstruction area (half of the vertical length and the lateral length of the reconstruction image), reference symbol D denotes distance between the X-ray source and the center of rotation (center of the reconstruction image), and reference numeral S denotes distance between the center of rotation and the sensor.

If using the location $Z_i$ on the central axis of the reconstruction image obtained in step S30, a line area of the Z'-coordinate on the projection image is represented by the following area (expression 3) this line area being calculated by the image process unit 107 on the basis of a location of the designated slice position (step S40):

$$Zi \times \frac{D+S}{D+R} \sim Zi \times \frac{D+S}{D-R} \quad (3)$$

In expression 3, reference symbol R denotes the radius of the reconstruction area (half of the vertical length and the lateral length of the reconstruction image), reference symbol D denotes distance between the X-ray source and the center of rotation (center of the reconstruction image), and reference numeral S denotes distance between the center of rotation and the sensor.

Next, the image process unit 107 executes the convolution process on the line area in the projection image data (step S50). The convolution process is executed by taking the convolution of lateral line data of the projection image data and one-dimensional data called a reconstruction function.

Figure 10:
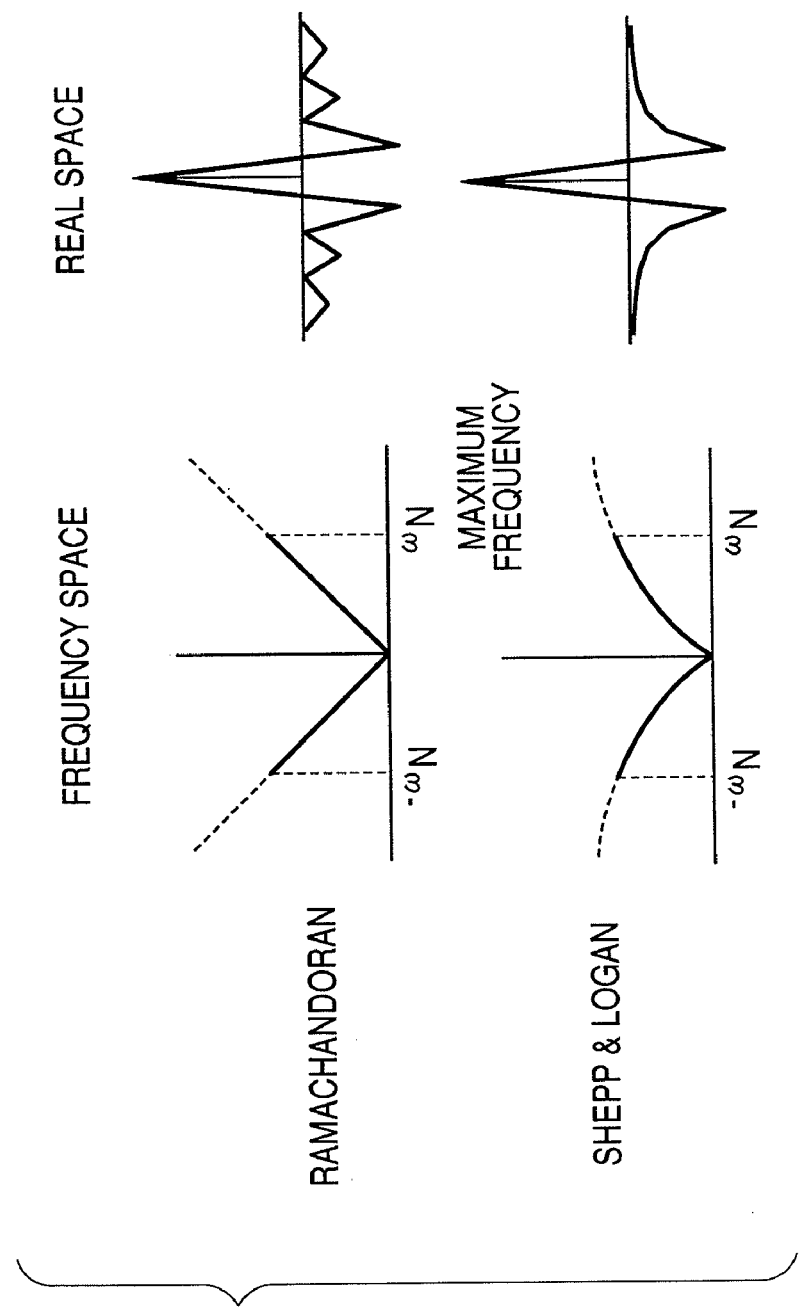
FIG. 10 is a conceptual view for explaining a reconstruction function.

The function of Ramachandoran and the function of Shepp & Logan are typical examples of the reconstruction function, and are shown in FIG. 10.

Figure 4:
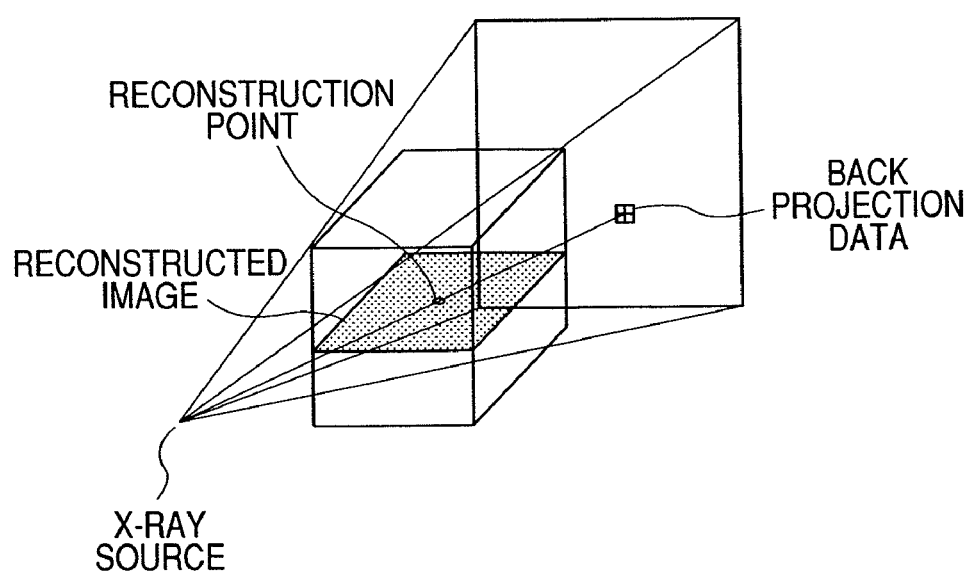
FIG. 4 is a conceptual view for explaining a back projection process.

Thereafter, a back projection process is executed by using the projection image data on which the convolution process has been executed (step S60). As shown in FIG. 4, the back projection process is executed in a manner, where as to each of pixels of the reconstruction image, the coordinate of a dot formed on the projection image by transmitting the X-ray through that pixel of the reconstruction image is obtained, and pixel values of four dots in the vicinity of a location of the obtained coordinate are calculated by interpolation, and then the obtained pixel values are summed up.

Figure 11:
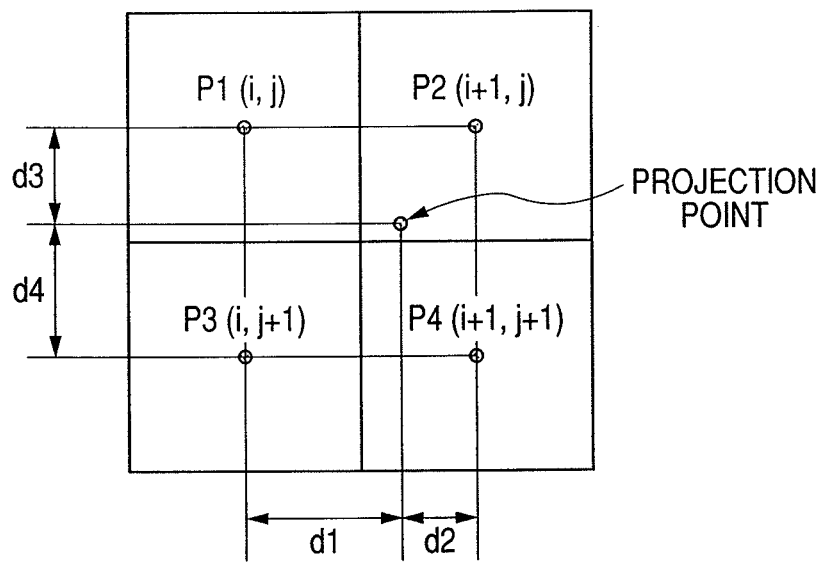
FIG. 11 is a conceptual view for explaining an interpolation.

Here, the geometrical relationship in the interpolation is shown in FIG. 11. In FIG. 11, dots P1 to P4 are central locations of the four pixels in the vicinity of the projected dot. If it is assumed that the distances between the projected dot and these four dots are respectively d1 to d4 and the pixel values of the four pixels in the vicinity of the projected dot are respectively Q1 to Q4, the interpolation may be executed by using back projection data V calculated by the following expressions 4:

$$A1 = \frac{Q1 \times d2 + Q2 \times d1}{d1 + d2} \quad (4)$$

-continued
$$A2 = \frac{Q3 \times d2 + Q4 \times d1}{d1 + d2}$$

$$V = \frac{A1 \times d4 + Q2 \times d3}{d3 + d4}$$

Then, if the back projection data V interpolated in this manner are summed up for the entire projection image data and the entire pixels, the reconstruction process is terminated.

As described above, the tomographic image of the designated slice position can be formed. The formed tomographic image is stored in the image storage unit 108 or displayed on the diagnostic monitor 109 (step S70).

In the present embodiment, the area necessary for reconstruction in the projection image is determined from the slice position to be reconstructed, and the convolution process and the back projection process are executed by using the determined area. Accordingly, unnecessary convolution and back projection processing can be omitted, thereby shortening the processing time of the reconstruction process.

Figure 12:
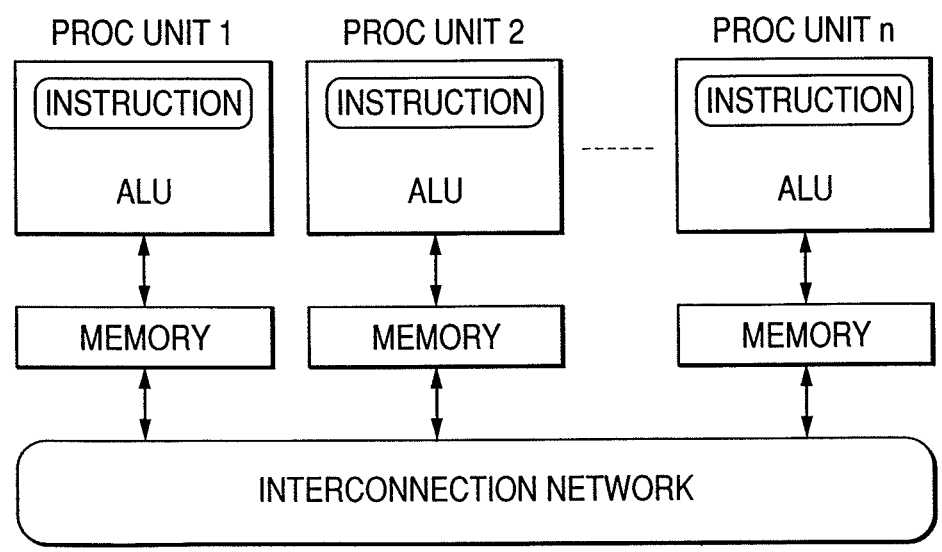
FIG. 12 is a conceptual view for explaining multi-computer MIMD (Multiple-Instruction stream, Multiple-Data stream) architecture.

In the present embodiment, it is intended that in a case of selecting plural portions of the slice positions of the tomographic image, the processes in the steps S30 to S60 indicated in a flowchart shown in FIG. 16 are executed in parallel in the respective process units. With respect to achieving such the parallelized processing, various architectures exist; however in the present embodiment, for example, the multi-computer MIMD architecture is used. This multi-computer MIMD architecture is illustrated in FIG. 12. As shown in FIG. 12, in the multi-computer MIMD architecture, memories are provided in the respective processing units.

Figure 13:
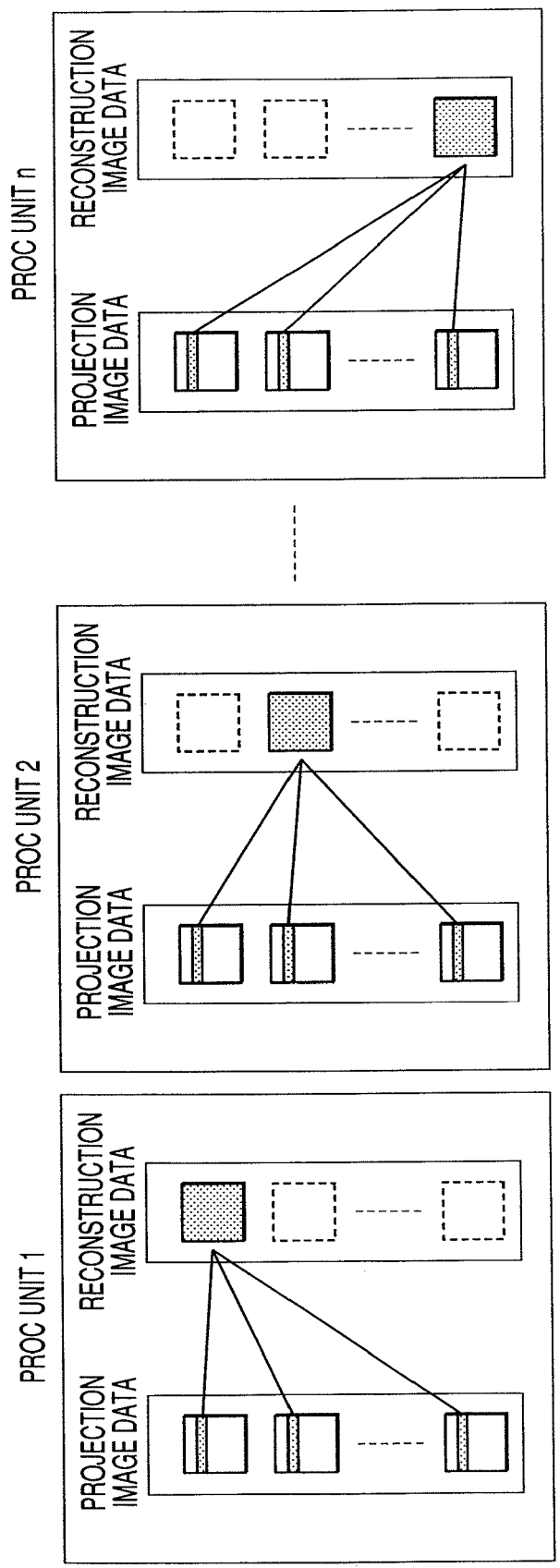
FIG. 13 is a conceptual view for explaining allocation of processes to respective process units.

In the present embodiment, the reconstruction images of the respective slice positions are allocated to the respective process units. Then, only data for the line area of the projection image necessary for the allocated reconstruction image is stored in the memory of each of the process units. The above conception is shown in FIG. 13.

Figure 14:
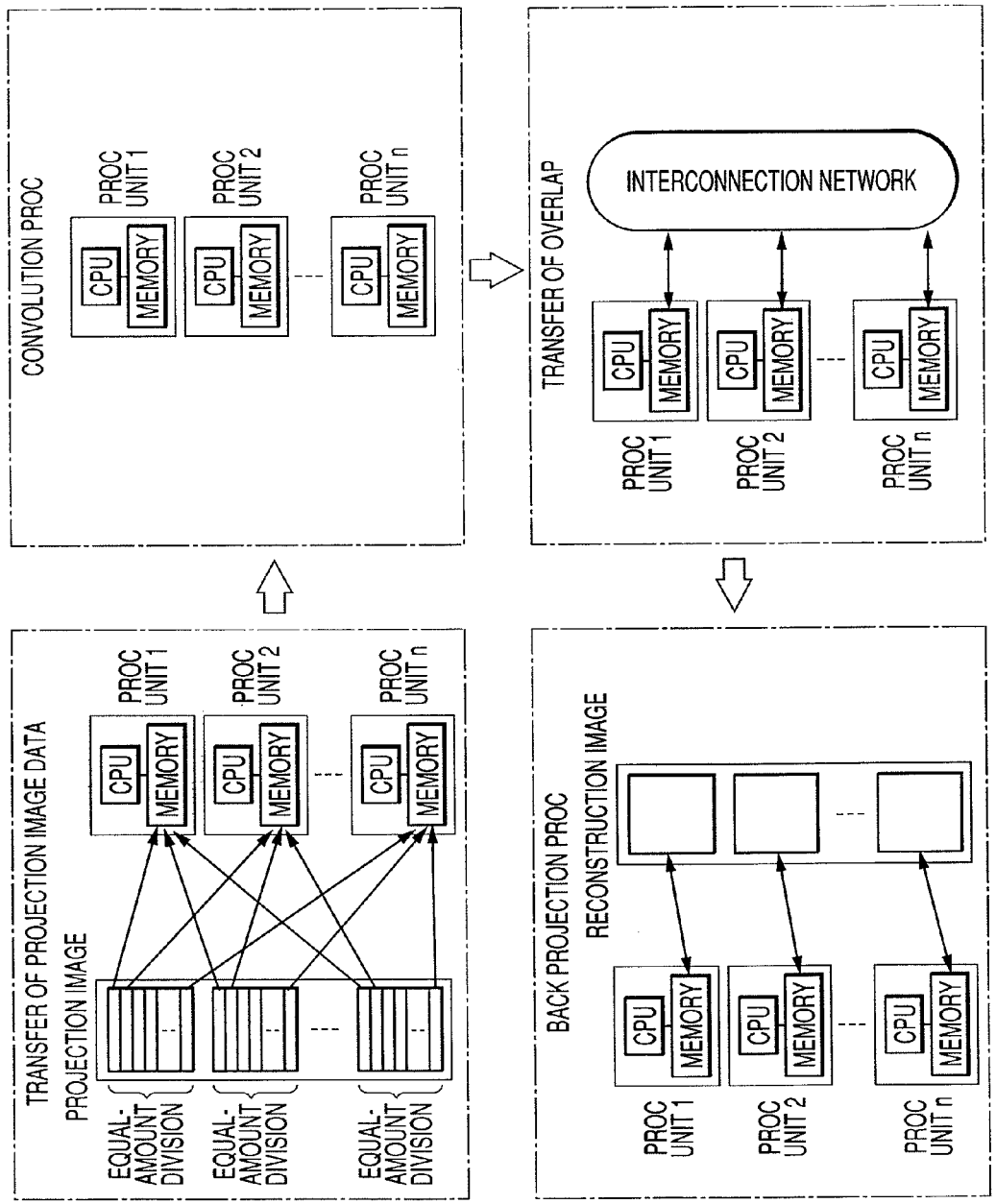
FIG. 14 is a conceptual view for explaining a flow of parallel processes.

Next, a flow of the parallelized reconstruction process as above described will be explained with reference to FIG. 14.

In this process, it is assumed that the pixel number of the reconstruction image row is equal to the number of the process units, and initially, the each projection image data is equally divided into data, of which the number is the number of the respective units, and the divided data is transferred to the memories of the respective process units.

Next, the convolution processes are executed to the equally divided projection image data in the respective process units. Here, the projection image data is equally divided in order to improve an effect of the parallelizing by uniformly dispersing the processing load on the respective process unit.

Figure 15:
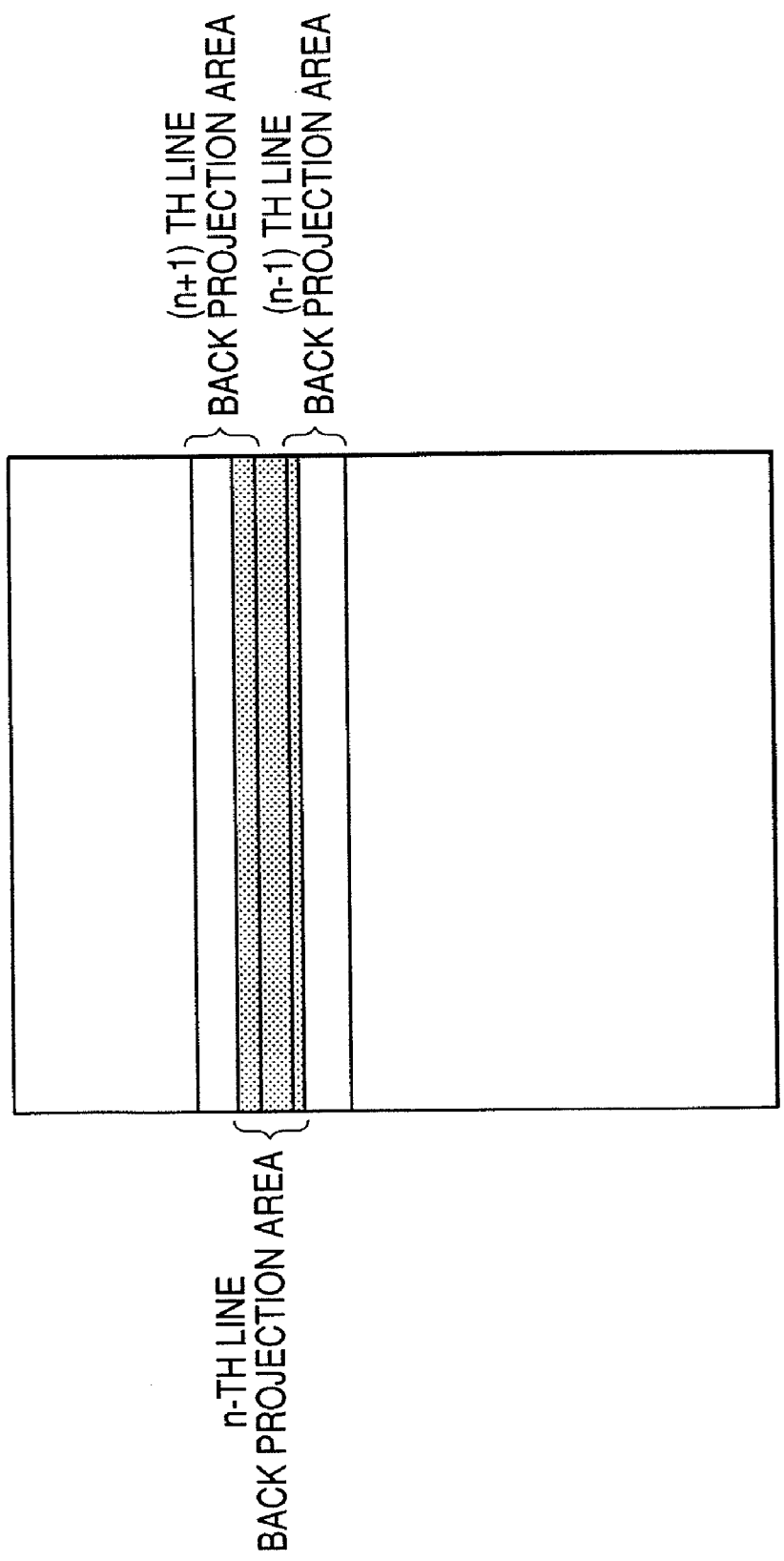
FIG. 15 is a conceptual view for explaining an overlapped line area.

Then, the back projection process is executed by using the projection image data resulted in executing the convolution process. However, the line area of the projection image data distributed to each of the process units at this time is not sufficiently satisfied by the equally divided line area. For example, as shown in FIG. 15, because there is a case that line areas necessary for the reconstruction image to be reconstructed by the respective process units are overlapped. In this case, it is required that data is to be transferred from the memory of another process unit. Therefore, in the present embodiment, the above transfer is executed by using an interconnection network. Then, after preparing necessary data, the back projection process is independently executed every the process unit.

In this manner, the reconstruction process in the cone beam CT can be effectively executed in parallel in the multi-computer MIMD architecture.

In the present embodiment, the slice position to be reconstructed is divided into plural blocks, and areas of the projection image corresponding to the divided blocks are cut out, and a unit of process is set every the block as local data of the each block, then a parallel process is executed by allocating the units of process to the units of operation. According to the above parallelizing, capacity of a local memory of each of the process units can be minimized and the costs can be reduced.

The foregoing embodiment of the present invention can be realized by executing the programs by means of, for example, a computer. Further, a means for supplying the programs to the computer, for example, a recording medium which can be read by the computer, such as a CD-ROM or the like storing the programs or a transmission/reception medium such as an internet or the like for transmitting and receiving the programs, can also be applied as embodiments of the present invention. Further, the above programs can be applied as the embodiment of the present invention. The above programs, the recording medium, the transmission/reception medium and the program products are included in the scope of the present invention.

This application claims priority from Japanese Patent Application No. 2004-239690 filed on Aug. 19, 2004, which is hereby incorporated by reference herein.

What is claimed is:

1. An image processing device comprising:
    an image input unit adapted to obtain a cone-beam CT image from a detector detecting X-rays that have passed through a subject;
    a designation unit adapted to designate plural slice positions of the subject;
    an extraction unit adapted to extract an area necessary for reconstruction of surfaces of the plural slice positions, based on space between the plural slice positions;
    a convolution processing unit adapted to perform a convolution processing on the extracted area extracted by said extraction unit; and
    an image processing unit adapted to execute a back projection processing for the reconstruction on the area on which the convolution processing has been performed by said convolution processing unit,
    wherein, in a case where it is assumed that a difference in height between the center of the area that is the target of the reconstruction and an X-ray source is $Z_i$, a distance in a horizontal direction between the center of the area that is the target of the reconstruction and the X-ray source is D, a distance in a horizontal direction between the center of the area that is the target of the reconstruction and a sensor is S, and a radius of the area that is the target of the reconstruction is R, said extraction unit extracts, as the area necessary for reconstruction, the area from $Z_i \times (D+S)/(D+R)$ to $Z_i \times (D+S)/(D-R)$ of the height based on the location of the X-ray source and the sensor.

2. An image processing device comprising:
    an image input unit adapted to obtain a cone-beam CT image from a detector detecting X-rays that have passed through a subject;
    a designation unit adapted to designate plural slice positions of the subject;
    an extraction unit adapted to extract plural areas necessary for reconstruction of surfaces of the plural slice positions, based on space between the plural slice positions;
    a convolution processing unit adapted to perform a convolution processing on the extracted area extracted by said extraction unit; and
    an image processing unit adapted to execute an image process for the reconstruction on each of the plural areas independently, the image process for the reconstruction including a back projection processing for reconstruction on the area on which the convolution processing has been performed by said convolution processing unit,
    wherein, in a case where it is assumed that a difference in height between the center of the area that is the target of the reconstruction and an X-ray source is $Z_i$, a distance in a horizontal direction between the center of the area that is the target of the reconstruction and the X-ray source is D, a distance in a horizontal direction between the center of the area that is the target of the reconstruction and a sensor is S, and a radius of the area that is the target of the reconstruction is R, said extraction unit extracts, as the area necessary for reconstruction, the area from $Z_i \times (D+S)/(D+R)$ to $Z_i \times (D+S)/(D-R)$ of the height based on the location of the X-ray source and the sensor.

3. An image processing device according to claim 2, wherein multi-computer MIMD architecture is used.

4. An image processing method comprising:
    an image input step of obtaining a cone-beam CT image from a detector detecting X-rays that have passed through a subject;
    a designation step of designating plural slice positions of the subject;
    an extraction step of extracting an area necessary for reconstruction of surfaces of the plural slice positions, based on space between the plural slice positions;
    a convolution processing step of performing a convolution processing on the extracted area extracted in said extraction step; and
    an image processing step of executing a back projection processing for reconstruction on the area on which the convolution processing has been performed in said convolution processing step,
    wherein, in a case where it is assumed that a difference in height between the center of the area that is the target of the reconstruction and an X-ray source is $Z_i$, a distance in a horizontal direction between the center of the area that is the target of the reconstruction and the X-ray source is D, a distance in a horizontal direction between the center of the area that is the target of the reconstruction and a sensor is S, and a radius of the area that is the target of the reconstruction is R, said extraction step includes extracting, as the area necessary for reconstruction, the area from $Z_i \times (D+S)/(D+R)$ to $Z_i \times (D+S)/(D-R)$ of the height based on the location of the X-ray source and the sensor.

5. An image processing method comprising:
    an image input step of obtaining a cone-beam CT image from a detector detecting X-rays that have passed through a subject;
    a designation step of designating plural slice positions of the subject;
    an extraction step of extracting plural areas necessary for reconstruction of surfaces of the plural slice positions, based on space between the plural slice positions;
    a convolution processing step of performing a convolution processing on the extracted area extracted in said extraction step; and
    an image processing step of executing an image process for the reconstruction on each of the plural areas independently, wherein the image process for the reconstruction includes a back projection processing for reconstruction on the area on which the convolution processing has been performed in said convolution processing step, wherein, in a case where it is assumed that a difference in height between the center of the area that is the target of the reconstruction and an X-ray source is $Z_i$, a distance in a horizontal direction between the center of the area that is the target of the reconstruction and the X-ray source is D, a distance in a horizontal direction between the center of the area that is the target of the reconstruction and a sensor is S, and a radius of the area that is the target of the reconstruction is R, said extraction step includes extracting, as the area necessary for reconstruction, the area from $Z_i \times (D+S)/(D+R)$ to $Z_i \times (D+S)/(D-R)$ of the height based on the location of the X-ray source and the sensor.

6. A computer-readable medium storing in executable form, a program for causing a computer to achieve an image processing method comprising:

an image input step of obtaining a cone-beam CT image from a detector detecting X-rays that have passed through a subject;

a designation step of designating plural slice positions of the subject;

an extraction step of extracting an area necessary for reconstruction of surfaces of the plural slice positions, based on space between the plural slice positions;

a convolution processing step of performing a convolution processing on the extracted area extracted in said extraction step; and an image processing step of executing a back projection processing for reconstruction on the area on which the convolution processing has been performed in said convolution processing step, wherein, in a case where it is assumed that a difference in height between the center of the area that is the target of the reconstruction and an X-ray source is $Z_i$, a distance in a horizontal direction between the center of the area that is the target of the reconstruction and the X-ray source is D, a distance in a horizontal direction between the center of the area that is the target of the reconstruction and a sensor is S, and a radius of the area that is the target of the reconstruction is R, said extraction step includes extracting, as the area necessary for reconstruction, the area from $Z_i \times (D+S)/(D+R)$ to $Z_i \times (D+S)/(D-R)$ of the height based on the location of the X-ray source and the sensor.

7. A computer-readable medium storing in executable form, a program for causing a computer to achieve an image processing method comprising:

an image input step of obtaining a cone-beam CT image from a detector detecting X-rays that have passed through a subject;

a designation step of designating plural slice positions of the subject;

an extraction step of extracting plural areas necessary for reconstruction of surfaces of the plural slice positions, based on space between the plural slice positions;

a convolution processing step of performing a convolution processing on the extracted area extracted in said extraction step; and an image processing step of executing an image process for the reconstruction on each of the plural areas independently, wherein the image process for the reconstruction includes a back projection processing for reconstruction on the area on which the convolution processing has been performed in said convolution processing step, wherein, in a case where it is assumed that a difference in height between the center of the area that is the target of the reconstruction and an X-ray source is $Z_i$, a distance in a horizontal direction between the center of the area that is the target of the reconstruction and the X-ray source is D, a distance in a horizontal direction between the center of the area that is the target of the reconstruction and a sensor is S, and a radius of the area that is the target of the reconstruction is R, said extraction step includes extracting, as the area necessary for reconstruction, the area from $Z_i \times (D+S)/(D+R)$ to $Z_i \times (D+S)/(D-R)$ of the height based on the location of the X-ray source and the sensor.

* * * * *